(12) United States Patent
Klein et al.

(10) Patent No.: US 6,989,274 B2
(45) Date of Patent: Jan. 24, 2006

(54) POLYASPARTIC ACID CONCENTRATION DETERMINATION BY FLUOROMETRY

(76) Inventors: Thomas Klein, Biberatr. 26, 50678 Köln (DE); Thomas Klausa, Ortsstr. 34, 69234 Horrenberg (DE); Andreas Elschner, Laderstr. 6, 43479 Muelheim (DE); Ralf-Johann Moritz, St. Andreas-Str. 20, 41469 Neuss (DE); Monika Cordes, Hauptstr. 91, 51373 Leverkusen (DE)

( * ) Notice: Subject to any disclaimer, the term of this patent is extended or adjusted under 35 U.S.C. 154(b) by 398 days.

(21) Appl. No.: 09/939,131

(22) Filed: Aug. 24, 2001

(65) Prior Publication Data
US 2002/0077262 A1 Jun. 20, 2002

(30) Foreign Application Priority Data
Aug. 30, 2000 (DE) ................ 100 42 498

(51) Int. Cl.
*G01N 31/00* (2006.01)

(52) U.S. Cl. ............. 436/85; 436/86; 435/24; 435/23; 435/25; 435/26

(58) Field of Classification Search ........... 436/86; 435/24, 23, 25, 26, 288
See application file for complete search history.

(56) References Cited

U.S. PATENT DOCUMENTS

| 4,813,973 A | 3/1989 | Winnik et al. ............. 8/647 |
| 4,839,461 A | 6/1989 | Boehmke ............. 528/363 |
| 5,128,419 A | 7/1992 | Fong et al. ............. 525/351 |
| 5,216,086 A | 6/1993 | Fong et al. ............. 525/351 |
| 5,279,945 A * | 1/1994 | Hummel ............. 435/24 |
| 5,292,864 A | 3/1994 | Wood et al. ............. 528/490 |
| 5,408,028 A | 4/1995 | Wood et al. ............. 528/328 |
| 5,484,860 A | 1/1996 | Wood et al. ............. 525/432 |
| 5,488,088 A | 1/1996 | Wood et al. ............. 525/432 |
| 5,493,004 A | 2/1996 | Groth et al. ............. 528/363 |
| 5,543,490 A | 8/1996 | Groth et al. ............. 528/328 |
| 5,594,077 A | 1/1997 | Groth et al. ............. 525/451 |
| 5,610,255 A | 3/1997 | Groth et al. ............. 526/304 |
| 6,355,771 B1 * | 3/2002 | Oda ............. 528/328 |

FOREIGN PATENT DOCUMENTS

| EP | 0 485 882 | 5/1992 |
| EP | 0 785 422 | 7/1997 |
| GB | 2 152 937 | 8/1985 |
| WO | 92/07087 | 4/1992 |

* cited by examiner

*Primary Examiner*—Jill Warden
*Assistant Examiner*—Sam P. Siefke
(74) *Attorney, Agent, or Firm*—Diderico van Eyl

(57) ABSTRACT

The present invention relates to a method of performing concentration determinations of aqueous solutions of polyaspartic acid and/or salts thereof.

8 Claims, 2 Drawing Sheets

POLYASPARTIC ACID CONCENTRATION DETERMINATION BY FLUOROMETRY

BACKGROUND OF THE INVENTION

The present invention relates to a method of performing concentration determinations of aqueous solutions or of determining on-line the dosing concentration of polyaspartic acids and/or their salts in aqueous systems.

When treating water, it is very important to maintain a constant level of the chemicals used. Too low a dose of a scale inhibitor might, in a cooling water circuit, entail reduced heat transfer due to calcium salt deposits. If fresh water is fed in, this requires the treatment chemicals to be restored to their old levels and consequently requires a concentration determination.

Analysis of the scale inhibitor is performed photometrically or titrimetrically, depending on the substance. A more economical approach would be provided by a physical method in which a test parameter that depends linearly on the concentration of, e.g., the scale inhibitor is measured on-line and is kept at a constant value using a dosing apparatus or facility.

EP-A 485,882 describes the use, as a scale inhibitor, of a polymer labelled with a fluorescence label such as, e.g., coumarin or its derivatives, the concentration, having been correlated to the fluorescent intensity, being corrected to an optimal value either automatically or manually.

EP-A 475,602 describes a method of fluorescence labelling of polyacrylic acid esters or amides by reamidation using fluorescent amines such as, e.g., tryptophan. In the latter case, incorporation amounts to 76%, 15 mol% of tryptophan having been used. Detection was possible down to 1 ppm.

The patent U.S. Pat. No. 4,813,973 describes the preparation of fluorescence-labelled polymers for uses in the field of flocculants, papermaking,and petroleum drilling. This involves the reaction of amide-containing polymers such as polyacrylamide with water-soluble dyes such as 9-xanthydrol in acetic acid.

Thermal polyaspartic acid from maleic anhydride and ammonia is most recently increasingly being used as a biodegradable alternative to polyacrylates in many applications. In some cases, a rapid and specific concentration determination method is called for, such as that known for fluorescence-labelled polyacrylic acids.

It is an object of the present invention to develop a method applicable also to polyaspartic acids ("PASP") for the purpose of determining concentrations in aqueous systems that allows permanent monitoring of the concentration of PASP in aqueous systems, in order thus to prevent, while plants are on-line, undesirable deposits in the form of inorganic or organic scaling from occurring while at the same time preventing the body of water from being polluted by excessive introduction of PASP as a scale inhibitor. The monitoring of the scale inhibitor should, moreover, function in flowing water streams and be feasible by on-line measurements.

Fluorometry is a widely used analytical measuring method in which a substance is excited by means of a light source (xenon lamp) and the intensity of the emitted fluorescent light is measured as a function of the excitation and emission wavelengths. It is used, inter alia, as a rapid, cost-effective "in situ" analysis method. Fluorescent spectroscopy is a recognized measurement method for measuring discharges into bodies of water. This involves the substances (i.e., active ingredients in a formulation) to be detected by being either chemically labelled by means of a label or being identified as a mixture using an added fluorescence label. Correlating the fluorescence label to the active ingredient proper is not always entirely simple. Problems arise from the differential breakdown behaviour on the thermal and the microbiological front. Moreover, masking, e.g., by complex formation, giving rise to passive fraction of the active ingredient, does not reflect a direct relationship to the label.

Consequently,such systems must always be employed in higher concentrations than strictly necessary. After all, too low a dosage of a scale inhibitor might, in a cooling water circuit, entail reduced heat transfer due to calcium deposits on the transfer surfaces.

Thermal polyaspartic acids from maleic anhydride and ammonia most recently are increasingly being used as a biodegradable alternative for polyacrylates in many applications. In water treatment in particular, thermal polyaspartic acid is intended to play a significant part in metal complexing and as a dispersant. One of the positive physical characteristics of thermal polyaspartic acids is their fluorescence. This should allow the active ingredient proper to be detected without any indirect measures. If this is to be done, linear dependencies of the fluorescent intensity on the concentration, breakdown (chemical, physical, or biological) or involvement as a dispersant or complexing agent would be desirable.

SUMMARY OF THE INVENTION

The present invention therefore relates to a method comprising performing concentration determinations of polyaspartic acids and/or salts thereof in aqueous systems by fluorometry.

DETAILED DESCRIPTION OF THE INVENTION

Figure 1:
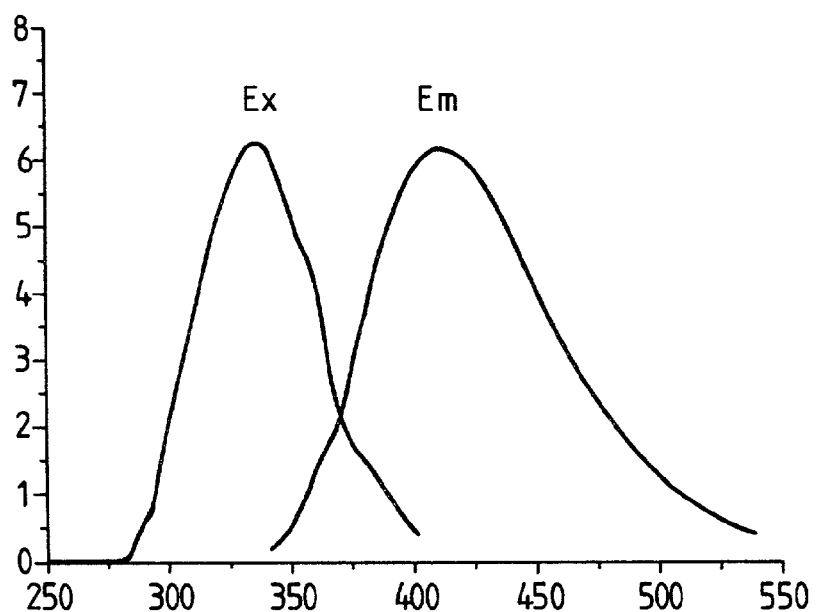
FIG. 1 shows the excitation wavelength Ex and the emission wavelength Em of polyaspartic acid.

The use of method of the invention permits accurate registration of polyaspartic acid concentrations in aqueous systems and uniform dosing of water treatment products. The excitation and emission wavelengths of polyaspartic acid are known, being 336 nm for excitation and 411 nm for emission (see FIG. 1: Ex is excitation peak $EX_{(max)}$:336 nm; Em is emission peak $Em_{(max)}$:411 nm).

The method according to the invention is suitable for determining the concentration of PASP or its salts prepared by thermal condensation starting from d,l-aspartic acid or an isomer of aspartic acid and of its salts or by thermal condensation of maleic anhydride, ammonia, sodium hydroxide solution, and water, and possible maleic anhydride secondary products such as fumaric acid, maleic acid, or their salts. The method according to the invention is particularly suitable for the analysis of PASP or its salts prepared via the Bayer process as disclosed in EP-A 256, 366, EP-A 604,813, EP-A 612,784, EP-A 650,995, or WO 94/03526 or in accordance with U.S. Pat. Nos. 5,408,028, 5,488,088, or 5,484,860.

The method according to the invention is suitable for determining the concentration of PASP or its salts in aqueous systems, preferably in distilled water, tap water, river water, and oil/water mixtures and in industrial liquid streams, natural waste water systems, industrial waste water systems such as, for example, paint shop waste water, building drainage systems, and other water systems such as, for example, cleaners, dispersions, and water-based formulations containing polyaspartic acids, where the deposition or renewed formation of inorganic or organic scales is to be prevented or where they are to be removed.

The invention is also suitable for the on-line determination of the dosing concentration, for example, in papermaking or petroleum drilling. The method according to the invention is further suitable for monitoring the PASP concentrations when these are used to prevent deposits as sugar juices are boiled down.

The method according to the invention is also suitable for the analysis of polyaspartic acids and/or their salts in aqueous systems or in oil/water systems. Relevant salts within the scope of the present invention include the alkali metal salts or alkaline earth metal salts of PASP, the sodium salt being preferred.

The method according to the invention is suitable for determining PASP concentrations over a wide concentration range in the particular aqueous system. The method is preferentially employed in the range between 0.1 and 1000 ppm, especially preferentially in the range of 1 to 100 ppm.

Figure 2:
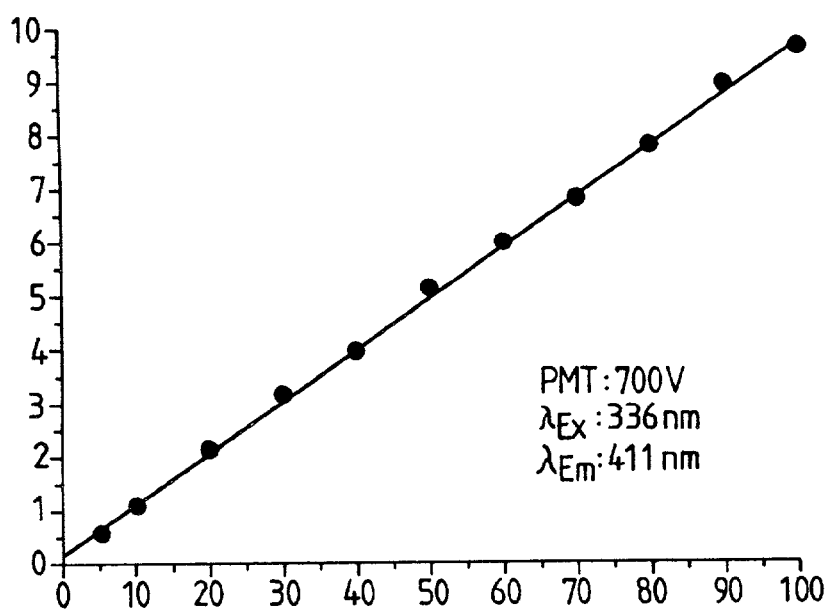
FIG. 2 shows the dependence of the fluorescent signal on the concentration of PASP.

FIG. 2 shows the dependence of the fluorescent signal on the PASP concentration in ppm in the form of a linear intensity increase with increasing concentration.

When, in particular, PASP is employed in industrial water treatment in cooling water systems, the method according to the invention is particularly advantageous in the range between 1 to 100 ppm.

The method according to the invention of determining PASP concentrations by fluorometry is suitable for application over a wide temperature range. The preferred application range involves temperatures between 0 and 70° C., particularly preferably temperatures between 20 and 30° C.

Technically it would be possible for water streams to be measured to be controlled to a constant temperature in the range from 20 to 30° C. by means of heat exchangers, as the variability of the signal in this range is only 5%.

Figure 3:
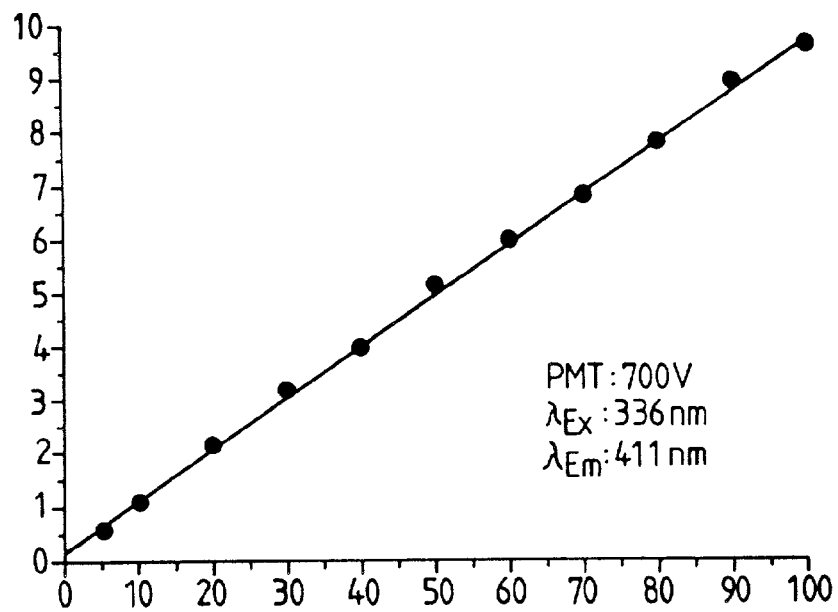
FIG. 3 shows the linear temperature dependence of the fluorescent activity of a PASP solution that is cooled from 70 to 0° C. and then reheated to 70° C. to exclude hysteresis effects.

FIG. 3 shows the linear temperature dependence of the fluorescent activity of a PASP solution (10 ppm) that is cooled from 70 to 0° C. and then reheated to 70° C. in order to exclude hysteresis effects. These, however, could not be detected. As the temperature increases, the signal drops monotonically.

The method according to the invention is suitable for determining the concentration of PASP in aqueous solutions over a wide pH range, preferably from 0 to 14, especially from 0 to 13. Usually, the variability of the pH in cooling water circuits is in the order of magnitude of 1.5 units in the neutral range between pH 6.5 and pH 8, whereas the variability of river water averaged over a year is about ± 0.5 pH units. When the concentration determinations are performed, the signal obtained is converted, according to its pH sensitivity and temperature sensitivity, at regular intervals to produce a standard value, and this corrected value is used to determine the actual concentration, allowing reliable values to be obtained even at a pH of 14.

Figure 4:
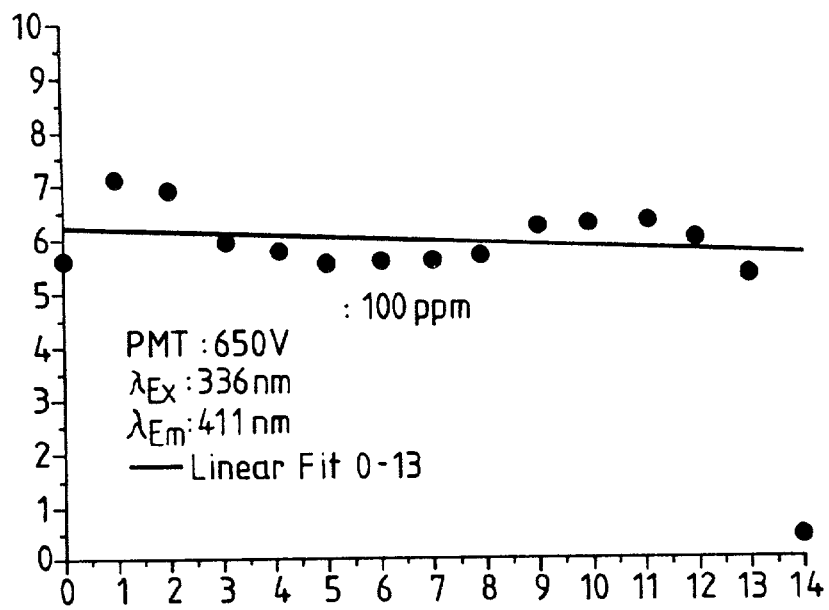
FIG. 4 shows the change in fluorescence intensity with pH.

FIG. 4 shows the fluorescent intensity over the entire pH range. The fluctuations within the given range are in the order of magnitude of 5%.

The method according to the invention can be implemented using any suitable fluorescence spectrometer. For the Bayer process PASP preferentially used according to the invention, the analytical procedure and mathematical analysis were carried out on a fluorescence spectrometer of type AMINCO-Bowman® series 2 (AB2) from Polytec GmbH, using the software "AB2 Luminescence Spectrometer version 5.0 Beta 1.45". Excitation was effected by a 150 W ozone-free xenon lamp (continuous wave). Precise scanning and high resolution were ensured by two high-performance monochromaters having a focal length of 200 mm, both on the excitation and the emission side. The photomultiplier (PMT) converts the optical signal into an electrical signal which is amplified and analysed by the electronics.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method comprising: a) selecting an aqueous system containing a polyaspartic acid and/or salts thereof, and b) performing a direct concentration determination of the polyaspartic acids and/or salts thereof in the aqueous system by fluorometry.

2. A method according to claim 1 wherein the concentration determination is performed on-line using a dosing apparatus or facility.

3. A method according to claim 1 wherein polyaspartic acids and/or salts thereof in the range of 0.1 to 1000 ppm are determined fluorometrically.

4. A method according to claim 1 carried out at a temperature range of 0 to 70° C.

5. A method according to claim 1 carried out in a pH range of 0 to 14.

6. A method according to claim 1 wherein the concentration determination of polyaspartic acids and/or salts thereof is performed for distilled water, tap water, river water, an industrial liquid stream, a natural waste water system, an industrial waste water system, a building drainage system, an oil/water mixture, and other water systems to which polyaspartic acids and/or salts thereof has been added to prevent or reverse or remove inorganic or organic scaling.

7. A method according to claim 1 wherein the concentration determination of polyaspartic acids and/or salts thereof added during papermaking or petroleum drilling is performed on-line using a dosing apparatus or facility.

8. A method according to claim 1 wherein the concentration determination of polyaspartic acids and/or salts thereof added to prevent deposit formation is performed while boiling down sugar juices.

* * * * *